(12) United States Patent
Mo et al.

(10) Patent No.: US 11,055,741 B2
(45) Date of Patent: Jul. 6, 2021

(54) MOBILE ADVERTISEMENT PROVIDING SYSTEM AND METHOD

(71) Applicants: Young Il Mo, Seoul (KR); Suk Kyeong Lee, Seoul (KR); Sung Hwan Mo, Seoul (KR); Su Hwan Mo, Seoul (KR); Yun Seo Mo, Seoul (KR)

(72) Inventors: Young Il Mo, Seoul (KR); Suk Kyeong Lee, Seoul (KR); Sung Hwan Mo, Seoul (KR); Su Hwan Mo, Seoul (KR); Yun Seo Mo, Seoul (KR)

(73) Assignees: G&G COMMERCE LTD., Seoul (KR); CANVASEE CO.. LTD., Seoul (KR)

( * ) Notice: Subject to any disclaimer, the term of this patent is extended or adjusted under 35 U.S.C. 154(b) by 0 days.

(21) Appl. No.: 16/013,364

(22) Filed: Jun. 20, 2018

(65) Prior Publication Data

US 2018/0300759 A1 Oct. 18, 2018

Related U.S. Application Data

(63) Continuation of application No. PCT/KR2017/005139, filed on May 18, 2017.

(30) Foreign Application Priority Data

Jun. 27, 2016 (KR) .................. 10-2016-0080353
Oct. 17, 2016 (KR) .................. 10-2016-0134216

(51) Int. Cl.
*G06Q 30/02* (2012.01)
*H04W 88/02* (2009.01)

(52) U.S. Cl.
CPC ......... *G06Q 30/0257* (2013.01); *G06Q 30/02* (2013.01); *G06Q 30/0256* (2013.01); *G06Q 30/0267* (2013.01); *H04W 88/02* (2013.01)

(58) Field of Classification Search
CPC ............................................ G06Q 30/00–0284
(Continued)

(56) References Cited

U.S. PATENT DOCUMENTS

| 2003/0046119 A1* | 3/2003 | Yamamoto | ......... G06Q 30/0601 705/5 |
| 2007/0073756 A1* | 3/2007 | Manhas | ................. G06Q 30/00 |

(Continued)

FOREIGN PATENT DOCUMENTS

| KR | 10-2009-0124873 A | 12/2009 |
| KR | 10-1217746 B1 | 1/2013 |

(Continued)

OTHER PUBLICATIONS

Jang, Youngkweon, et al., "Keyword Management System based on Ontology for Contextual Advertising", Sixth International Conference on Advanced Language Processing and Web Information Technology (ALPIT 2007), Luoyang, China, 2007, pp. 440-445 (Year: 2007).*

(Continued)

*Primary Examiner* — John Van Bramer
(74) *Attorney, Agent, or Firm* — Nath, Goldberg & Meyer; Joshua B. Goldberg

(57) ABSTRACT

The present invention relates to a mobile advertisement providing system, and more specifically to technology for a mobile advertisement providing system which includes an information display button and displays content and advertisement information provided onto a current screen in response to the manipulation of the information display button.

11 Claims, 11 Drawing Sheets

(58) Field of Classification Search
USPC .............................................. 705/14.1–14.73
See application file for complete search history.

(56) References Cited

U.S. PATENT DOCUMENTS

| | | | | |
|---|---|---|---|---|
| 2010/0306805 | A1* | 12/2010 | Neumeier | H04N 21/4316 |
| | | | | 725/60 |
| 2014/0046976 | A1* | 2/2014 | Zhang | G06Q 10/10 |
| | | | | 707/772 |
| 2014/0207758 | A1* | 7/2014 | Lu | G06F 16/951 |
| | | | | 707/722 |
| 2014/0372216 | A1* | 12/2014 | Nath | G06Q 30/0251 |
| | | | | 705/14.54 |

FOREIGN PATENT DOCUMENTS

| | | |
|---|---|---|
| KR | 10-2014-0062581 A | 5/2014 |
| KR | 10-2014-0087129 A | 7/2014 |
| KR | 10-1473780 B1 | 12/2014 |
| KR | 10-1503348 B1 | 3/2015 |
| KR | 10-2016-0020429 A | 2/2016 |
| KR | 10-2016-0090472 A | 8/2016 |

OTHER PUBLICATIONS

Kim, Kyongmin, et al., "Keyword Management System based on Ontology for Contextual Advertising", Korean Society for Internet Information, Jun. 2007, pp. 479-483, http://www.dbpia.co.kr/Article/NODE00871791.

* cited by examiner

MOBILE ADVERTISEMENT PROVIDING SYSTEM AND METHOD

CROSS-REFERENCE TO RELATED APPLICATIONS

This application is a continuation application of International Application No. PCT/KR2017/005139 filed on May 18, 2017, which claims priority to Korean Application No. 10-2016-0080353 filed on Jun. 27, 2016 and Korean Application No. 10-2016-0134216 filed on Oct. 17, 2016. The applications are incorporated herein by reference.

TECHNICAL FIELD

The present invention relates to technology for a mobile advertisement providing system, and more specifically to a mobile advertisement providing system and method which include an information display button and display content and advertisement information provided onto a current screen in response to the manipulation of the information display button.

BACKGROUND ART

Recently, people have purchased books in a mobile device and then picked up the books at offline bookstores, have called taxies in a mobile device, and have made payments in a mobile device after having meals at restaurants. Using an SNS or performing mobile shopping while watching TV has been already familiar with people. "Mobile" technology is present at the center of a situation in which people use media across the boundary between online and offline environments as described above. As mobile technology has been closely involved in our lives, interest in mobile advertisement technology has grown.

Existing advertisements provided in a mobile device have been provided in a form on which advertisements are displayed using an intermediate region, a popup screen, or a region, such as the upper or lower end or the like of a mobile device. This advertisement display method disturbs the concentration of users on, and may sometimes cause confusion due to advertisements irrelevant content.

For the above-described reason, advertisement blocking technologies are increasing. Efforts have been made to reduce the fatigue of users, caused by flood advertisements, in such a way that manufacturers, such as Google, Apple, etc., and operating software providers provide an advertisement blocking application or equip an operating system (OS) with an advertisement blocking function and then provide the OS, in such a way that some mobile communication service providers in Europe provide the function of eliminating all advertisements in mobile applications to mobile phone subscribers, for example, the technology of Israeli start-up Shine, and so forth.

However, advertisement blocking has a large impact on the Internet industry for which online advertising is the main source of revenue. As an actual example, Google, Microsoft, Amazon, etc. are known to pay German start-up Eyeo in exchange for removal from an advertisement blocking list. Eyeo is the developer of Adblock Plus, which is the most widely used advertisement blocking program in the world. Furthermore, it is believed that the intention to receive money from information technology (IT) companies, such as Google, etc., is present behind a situation in which mobile communication companies attempt to basically provide advertisement blocking. This is analyzed as occurring because communication service providers have been deprived of the initiative of digital content business by global IT companies and are simply providing only Internet networks. For this reason, the provision of an advertisement blocking function by Apple is analyzed as a strategy for enhancing bargaining power. Accordingly, the leading move of global companies toward advertisement content may damage other companies, and therefore there is a tendency to require an integrated advertisement platform.

Conventionally, Korean Patent No. 10-1503348 entitled "Mobile Advertisement Method and System Using User Usage Patterns" discloses a method of analyzing the usage patterns of a user, providing a targeted advertisement, and providing an advertisement in a popup or push advertising form.

This conventional technology is configured to provide an advertisement in a popup or push advertising form based on the usage pattern of a user. Accordingly, an advertisement is provided when a user does not want to view an advertisement, and thus it is impossible for a user to be provided with an advertisement only when the user wants to view an on demand.

Therefore, there is a need for mobile technology for an advertisement providing system by which when a user wants to view specific information, such as an opted-in advertisement, shopping, or the like, the user can open a new screen while maintaining an existing content screen without change and separately view specific information, such as an opted-in advertisement, shopping, or the like.

SUMMARY

An object of the present invention is to provide an advertisement to a user in response to the manipulation of an information display button, thereby immediately providing the information desired by the user at the time desired by the user.

An object of the present invention is to include an advertisement display button and a shopping display button in an information display button, thereby immediately providing desired information to a user while maintaining a content screen desired and being currently viewed by the user.

An object of the present invention is to provide each mobile terminal with a separate manipulation device configured to enable a user to invoke desired information at anytime via a device, such as a device equipped with a separate manipulation button or touch sensor, or the like, a separate display, or the like.

An object of the present invention is to dispose a separate display, other than the basic display screen of a mobile terminal, on a top or side surface or bezel, and to enable the separate display to output an information display button including an advertisement display button and a shopping display button and to receive the touch input of a user, thereby immediately providing desired information to the user.

An object of the present invention is to mount a physical button on the upper or lower end or left or right edge of a mobile terminal, thereby utilizing the function of displaying specific information, such as advertisement information, shopping information, or the like.

An object of the present invention is to provide a mobile terminal with an advertisement information lamp and a shopping information lamp on part of the upper or lower end bezel thereof, and to enable an information output unit to indicate whether output information is advertisement information or shopping information via the advertisement information lamp and the shopping information lamp, thereby enabling a user to more conveniently and rapidly determine whether information being currently viewed is on demand or opted-in advertisement information or shopping information.

An object of the present invention is to enable an information search relay server to receive advertisement information and shopping information including display information and link information to be output by an output unit directly from an advertiser, thereby enabling the advertiser to provide the advertisement information and the shopping information without the intervention of a middle agent.

An object of the present invention is to verify advertisement information and shopping information received from an advertiser, thereby providing more accurate advertisement information and shopping information to a user.

An object of the present invention is to determine whether display information and link information match each other, thereby providing more accurate advertisement information and shopping information to a user.

An object of the present invention is to enable a user to delete the deletion target information of output advertisement information and shopping information and receive a reason for the deletion, thereby immediately preventing information not desired by the user from being provided, and to receive reasons for deletions from a plurality of users, thereby providing more accurate information to users.

An object of the present invention is to determine whether to block advertisement information and shopping information based on a received reason for deletion and information about the number of deletions, thereby providing more accurate advertisement information and shopping information to a user.

An object of the present invention is to segment the display screen of a mobile terminal or construct a popup screen and output keyword-related information while maintaining content output, thereby providing the convenience in which a user can view both content being currently viewed and desired information.

An object of the present invention is to extract a keyword for part of content being displayed on the screen of a mobile terminal, and to, when part of the content being displayed on the display screen of the mobile terminal is changed, extract a keyword for the changed part of the content and output information related to the keyword onto a segment screen or popup screen output by an information output unit, thereby more conveniently providing desired information in real time without separately searching for information about which a user is curious.

In order to accomplish the above objects, according to an aspect of the present invention, there is provided a mobile advertisement providing system, including: a mobile terminal configured to include an information display button; a keyword extraction unit configured to be driven in the mobile terminal, and to extract keyword information related to content displayed on the mobile terminal by detecting and analyzing the content; a keyword transmission unit configured to transmit the keyword information, extracted by the keyword extraction unit, to an information search relay server; an information reception unit configured to request keyword-related information from the information search relay server in response to the pressing of the information display button, and to receive the keyword-related information from the information search relay server; an information output unit configured to output the keyword-related information, received by the information reception unit, onto the display screen of the mobile terminal; and an information management unit configured to manage the information output by the information output unit.

Furthermore, the information output by the information output unit may be advertisement information or shopping information, and the information display button may include an advertisement display button or a shopping display button.

Furthermore, the mobile terminal may include an advertisement information lamp and a shopping information lamp on an upper end bezel or lower end bezel portion, and the information output unit may indicate whether output information is the advertisement information or shopping information via the advertisement information lamp and the shopping information lamp.

Furthermore, the information search relay server may receive the advertisement information and the shopping information directly from an advertiser; and the received advertisement information and shopping information may include display information and link information to be output by the information output unit.

Furthermore, the information output unit may segment the display screen of the mobile terminal or construct a popup screen, and may output the keyword-related information while maintaining the output of the content.

Furthermore, the keyword extraction unit may extract a keyword for part of the content displayed on the display screen of the mobile terminal; and, when part of the content displayed on the display screen of the mobile terminal is changed, may extract a keyword for the changed part of the content, and output the keyword-related information onto the segment screen or popup screen output by the information output unit.

Furthermore, the user search unit may be configured to include the function of enabling the user to search for the extracted keywords, i.e., the function of searching for curation information obtained by combining a keyword extracted from the content, an information category allocated to the keyword and information connected to a category, a keyword defined by another user, etc.

The present invention is configured to provide an advertisement to a user in response to the manipulation of an information display button, thereby immediately providing the information desired by the user at the time desired by the user.

The present invention is configured to include an advertisement display button and a shopping display button in an information display button, thereby immediately providing desired additional information to a user while maintaining a content screen desired and being currently viewed by the user.

The present invention is configured to dispose a separate display, other than the basic display screen of a mobile terminal, on a top or side surface or bezel, and to enable the separate display to output an information display button including an advertisement display button and a shopping display button and to receive the touch input of a user, thereby immediately providing desired information to the user.

The present invention is configured to provide a mobile terminal with an advertisement information lamp and a shopping information lamp, and to enable an information output unit to indicate whether output information is advertisement information or shopping information via the advertisement information lamp and the shopping information lamp, thereby enabling a user to more conveniently and rapidly determine whether information being currently viewed is advertisement information or shopping information.

The present invention is configured to enable an information search relay server to receive advertisement information and shopping information including display information and link information to be output by an output unit directly from an advertiser, thereby enabling the advertiser to provide the advertisement information and the shopping information without the intervention of a middle agent.

The present invention is configured to verify advertisement information and shopping information received from an advertiser, thereby providing more accurate advertisement information and shopping information to a user.

The present invention is configured to determine whether display information and link information match each other, thereby providing more accurate advertisement information and shopping information to a user.

The present invention is configured to enable a user to delete the deletion target information of output advertisement information and shopping information, and receive a reason for the deletion, thereby immediately preventing information not desired by the user from being provided, and to receive reasons for deletions from a plurality of users, thereby providing more accurate information to users.

The present invention is configured to determine whether to block advertisement information and shopping information based on a received reason for deletion and information about the number of deletions, thereby providing more accurate advertisement information and shopping information to a user.

The present invention is configured to segment the display screen of a mobile terminal or construct a popup screen and output keyword-related information while maintaining content output, thereby providing the convenience in which a user can view both content being currently viewed and desired information.

The present invention is configured to extract a keyword for part of content being displayed on the screen of a mobile terminal, and to, when part of the content being displayed on the display screen of the mobile terminal is changed, extract a keyword for the changed part of the content and output information related to the keyword onto a segment screen or popup screen output by an information output unit, thereby more conveniently providing desired information in real time without separately searching for information about which a user is curious.

The present invention is configured to provide the function of invoking information, such as an advertisement, shopping, or the like, onto a region where a functional function, such as a copy function, a translation function, or the like, is executed by dragging a word, a sentence, an image, or the like by means of a drag function provided by a mobile terminal, thereby providing a method for viewing desired information without extracting a keyword.

The present invention is configured to reduce a search range through curation, such as the input of information, such as a keyword or category, directly input by a user and the combination of two keywords, via the search function of a search unit, thereby providing a method for improving the accuracy of desired information.

DETAILED DESCRIPTION

Figure 1:
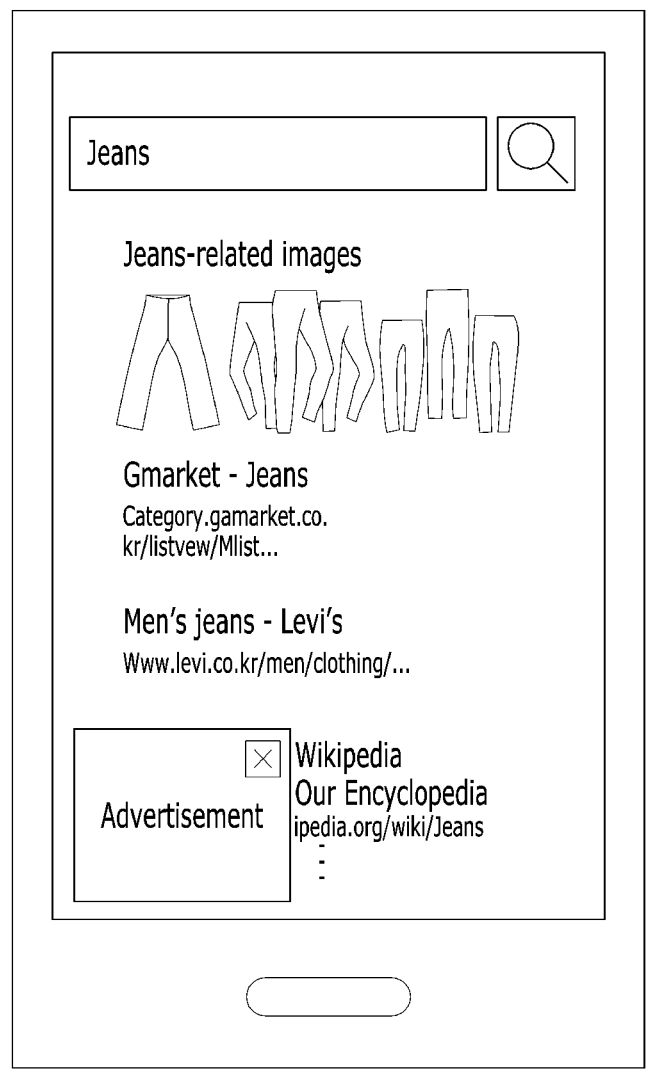
FIG. 1 is a view showing an example of a mobile advertisement screen according to conventional technology.

In order to accomplish the above objects, according to an aspect of the present invention, there is provided a mobile advertisement providing system, including: a mobile terminal configured to include an information display button; a keyword extraction unit configured to be driven in the mobile terminal, and to extract keyword information related to content displayed on the mobile terminal by detecting and analyzing the content; a keyword transmission unit configured to transmit the keyword information, extracted by the keyword extraction unit, to an information search relay server; an information reception unit configured to request keyword-related information from the information search relay server in response to the pressing of the information display button, and to receive the keyword-related information from the information search relay server; an information output unit configured to output the keyword-related information, received by the information reception unit, onto the display screen of the mobile terminal; and an information management unit configured to manage the information output by the information output unit.

Furthermore, the information output by the information output unit may be advertisement information or shopping information, and the information display button may include an advertisement display button or a shopping display button.

Furthermore, the mobile terminal may include an advertisement information lamp and a shopping information lamp on an upper end bezel or lower end bezel portion, and the information output unit may indicate whether output information is the advertisement information or shopping information via the advertisement information lamp and the shopping information lamp.

Furthermore, the information search relay server may receive the advertisement information and the shopping information directly from an advertiser; and the received advertisement information and shopping information may include display information and link information to be output by the information output unit.

Furthermore, the information output unit may segment the display screen of the mobile terminal or construct a popup screen, and may output the keyword-related information while maintaining the output of the content.

Furthermore, the keyword extraction unit may extract a keyword for part of the content displayed on the display screen of the mobile terminal; and, when part of the content displayed on the display screen of the mobile terminal is changed, may extract a keyword for the changed part of the content, and output the keyword-related information onto the segment screen or popup screen output by the information output unit.

Furthermore, the user search unit may be configured to include the function of enabling the user to search for the extracted keywords, i.e., the function of searching for curation information obtained by combining a keyword extracted from the content, an information category allocated to the keyword and information connected to a category, a keyword defined by another user, etc.

Preferred embodiments of the present invention will be described in detail below with reference to the accompanying drawings. Furthermore, in the description of the embodiments of the present invention, specific numerical values are merely examples, and the scope of invention is not limited by the specific numerical values.

A mobile advertisement providing system according to the present invention may be configured in the form of a server which includes a central processing unit (CPU) and memory (storage) and is connectable to another terminal over a communication network, such as the Internet or the like. However, the present invention is not limited by the configuration of the central processing unit, the memory, etc. Furthermore, the mobile advertisement providing system according to the present invention may be implemented as a single apparatus, or may be implemented in a form distributed among a plurality of apparatuses, in a physical sense. Accordingly, the present invention is not limited by the configuration of a physical apparatus(es).

Figure 2:
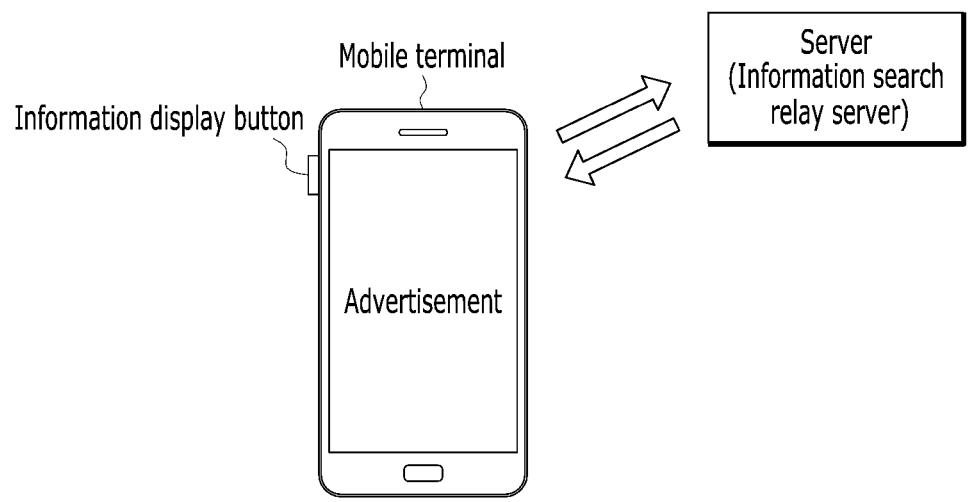
FIG. 2 is a view showing the configuration of a mobile advertisement providing system according to an embodiment of the present invention.

FIG. 2 is a view showing the configuration of a mobile advertisement providing system according to an embodiment of the present invention.

The mobile advertisement providing system according to the present invention includes an information display button 116, and enables advertisement information related to content provided to a current screen to be displayed in response to the manipulation of the information display button 116.

The mobile terminal 110 includes the information display button 116 and a system configured to detect content, and may transmit information to an information relay server functioning as a server.

Figure 3:
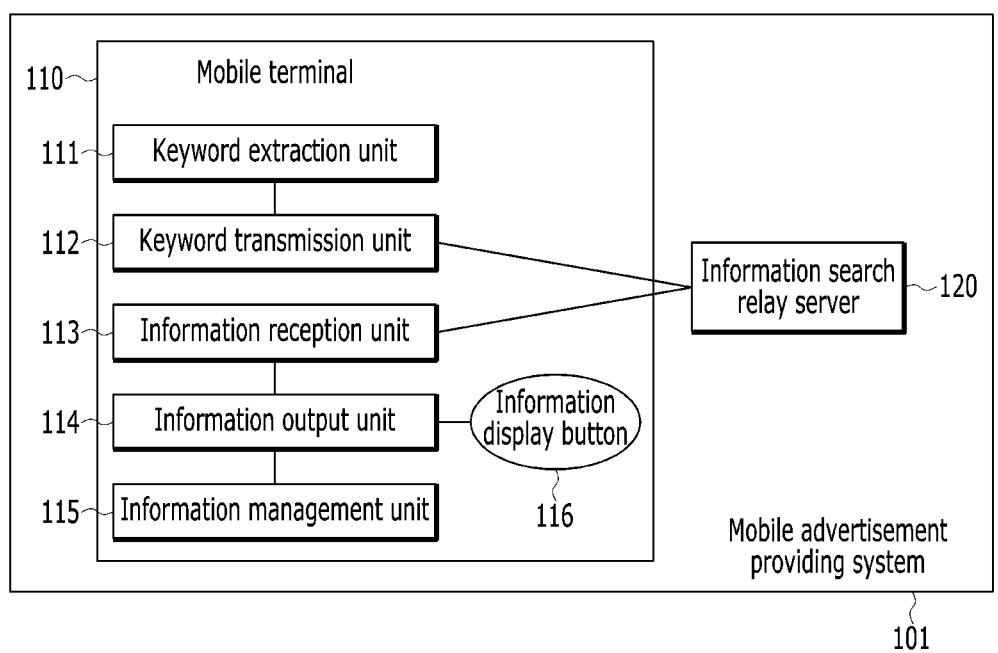
FIG. 3 is a view showing the overall configuration of the mobile advertisement providing system according to the embodiment of the present invention.

FIG. 3 is a view showing the overall configuration of the mobile advertisement providing system according to the embodiment of the present invention.

The mobile terminal 110 includes the information display button 116.

The information display button 116 includes an advertisement display button and a shopping display button. A separate display, other than the basic display screen of the mobile terminal 110, is disposed in a top or side surface or bezel, and the separate display outputs the information display button 116 including the advertisement display button and the shopping display button and receives the touch input of a user.

The information display button 116 may be implemented as a separate display located on a top or side surface or bezel, and may be a button disposed on the top or side surface or bezel of the mobile terminal 110 and configured to be pressed.

The keyword extraction unit 111 is driven in the keyword extraction engine of the mobile terminal 110 and the information relay server. The keyword extraction unit 111 extracts keyword information related to content displayed on the mobile terminal 110 by detecting and analyzing the content.

The content displayed on the mobile terminal 110 may be any website or application which can be displayed on a mobile device. The keyword extraction unit 111 extracts related keyword information by analyzing text or an image included in a website or application which is being viewed by a user.

The keyword transmission unit 112 transmits the keyword information, extracted by the keyword extraction unit 111, to an information search relay server 120.

The keyword extraction unit 111 is driven in conjunction with the information search relay server 120 via the mobile terminal 110. The keyword extraction unit 111 detects content displayed on the mobile terminal 110, and transmits the content to the information search relay server. The information search relay server transmits a keyword, extracted by analyzing the content, to the mobile terminal via the keyword transmission unit 112.

The content displayed on the mobile terminal 110 may be any website or application which can be displayed on a mobile device. The keyword extraction unit 111 of the information search relay server 120 extracts related keyword information by analyzing text or an image included in a website or application which is being viewed by a user.

The keyword transmission unit 112 transmits the keyword information, extracted by the keyword extraction unit 111, to the mobile terminal 110 via the information search relay server 120.

The information reception unit 113 requests keyword-related information from the information search relay server 120 in response to the touch or the pressing of the information display button 116, and receives the keyword-related information from the information search relay server 120.

The information search relay server 120 receives advertisement information and shopping information directly from an advertiser, and the received advertisement information and shopping information may include display information and link information to be output by the information output unit 114.

The information search relay server 120 possesses a search system configured to search for specific information, such as an advertisement, shopping, or the like. The information search relay server 120 provides a system configured to link mobile users to advertisements related to content so that the mobile users can easily view the advertisements which advertisers advertise, thereby more efficiently providing advertisement marketing and providing the information of the advertisements provided by the advertisers to the users. The specific information may include travel information, scientific and technical information, food and drug and health information, news information, entertainment information, movie information, and media information.

Furthermore, advertisers who desire to place advertisements regarding search services, such as Google, Baidu, etc., various types of shopping malls, or the like, may register advertisement information and keywords corresponding to advertisements in the information search relay server 120, and thus the corresponding advertisements may be transferred to users upon the invocation of the users, thereby providing the advertisements to a plurality of users. Furthermore, the present invention may be used in SNS advertisement, and may be also used in a method for creating the profits of advertising fees from users in conjunction with an affiliation platform.

The information search relay server 120 includes an information verification unit configured to verify advertisement information and shopping information received from an advertiser. The information verification unit determines whether the display information and the link information received from an advertiser match each other. Furthermore, whether the link information includes malicious code or not is determined.

When an advertiser directly inputs advertisement, shopping information, or the like to the information search relay server 120, the advertiser may input advertisement and shopping information including a keyword or description different from an advertisement target product or advertisement target information in order to enable the advertisement or the like to be searched for by or exposed to a large number of persons. There is required a means for verifying such wrong information, and the information verification unit verifies the wrong information. Furthermore, verification may be performed to prevent the mobile terminal 110 of a user from being infected with malicious code or a computer virus by determining whether malicious code is included in the link information.

The information output unit 114 outputs the keyword-related information, received from the information reception unit 113, onto the display screen of the mobile terminal 110.

The information output unit 114 may segment the display screen of the mobile terminal 110 or construct a popup screen, and may then output keyword-related information while maintaining content output.

The keyword extraction unit 111 may extract a keyword for part of content being displayed on the screen of the mobile terminal 110, and, when part of content being displayed on the display screen of the mobile terminal 110 is changed, may extract a keyword for the changed part of the content and output information related to the keyword onto a segment screen or popup screen output by the information output unit 114.

The keyword extraction unit 111 may extract a keyword entered into a search box by a user, may extract a keyword by analyzing content extracted via the keyword entered into the search box by the user, and may output information related to the keyword onto a segment screen or popup screen output by the information output unit 114.

The keyword extraction unit 111 may extract a keyword for the information of content dragged by a user, and, when part of the information dragged by the user is changed, may extract a keyword by analyzing the changed information and output information related to the keyword onto a segment screen or popup screen output by the information output unit.

The information output unit 114 may output advertisement information or shopping information onto a segment display screen or popup screen while maintaining a screen which is being viewed by a user. Whenever the content being viewed by the user is changed, the advertisement information or shopping information may be updated according to the changed content via a segment screen or popup screen, and thus the advertisement information or shopping information may be viewed in real time.

The mobile terminal 110 may include an advertisement information lamp and a shopping information lamp. The information output unit 114 may perform control so that whether output information is advertisement information or shopping information is indicated via the advertisement information lamp or shopping information lamp.

The information output by the information output unit 114 may separately include advertisement information and shopping information. Whether information being viewed by a user is advertisement information or shopping information may be indicated via the advertisement information lamp or shopping information lamp, and thus the user may more conveniently and rapidly determine whether information being currently viewed by the user is advertisement information or shopping information.

An advertiser may directly input advertisement information and shopping information to be output onto the information output unit 114 via an information search relay platform. The advertiser may provide both display information including a keyword, an image, and/or the like adapted to show advertisement or shopping information and link information guiding movement to the advertisement or shopping information to a user.

The information management unit 115 manages information output by the information output unit 114.

The information management unit 115 may enable a user to delete deletion target information from the output advertisement information and shopping information, may receive a reason for the deletion, and may determine whether to block the advertisement information and the shopping information based on the received reason for the deletion and information about the number of deletions.

A user may select and delete the advertisement information or shopping information output by the information output unit 114, and may input a reason for the deletion. When the reason for the deletion indicates that the output information does not match information or a product desired by the user, the corresponding advertisement information and shopping information may be blocked. Furthermore, the number of deletions is a basis for the determination of whether to block. When the number of deletions is large, the corresponding information has strong possibility of being information not desired by a user. Accordingly, the priority of the corresponding information is lowered, and thus the corresponding information may become data which is not preferentially viewed to a user.

An information control system includes a keyword extraction unit 111, a keyword transmission unit 112, an information reception unit 113, an information output unit 114, and an information management unit 115.

The information display button 116 may be mounted in the mobile terminal 110 such that when a user desires to view specific information, such as an advertisement, shopping or the like, the user may open a new screen (layer) while maintaining an existing content screen without change and may then separately view specific information, such as an advertisement, shopping, or the like, or activate specific information, such as an advertisement, shopping, or the like.

Methods by which the information display button 116 derives specific information, such as an advertisement, shopping, or the like, may include hardware and software methods for invoking corresponding content anytime a user desires.

According to the hardware method, a button may be mounted in a specific region in the left side, right side, or upper end of the mobile terminal 110, and the specific region may be a bezel portion or edge. The corresponding button includes ON and OFF functions. When a user converts the information display button 116 into an ON state by pressing it, specific information, such as an advertisement, shopping, or the like, may be viewed. The specific information, such as an advertisement, shopping, or the like, which may be displayed when the information display button 116 is clicked may be provided in such a manner that a system operating in conjunction with the information display button 116 analyzes a corresponding screen based on a mobile screen being currently viewed by a user and provides related information. Furthermore, a user may control the range of advertisement or the like by selecting the partial text, image or the like of a corresponding screen and then clicking the button.

When the information display button 116 is clicked, specific information, such as an advertisement, shopping, or the like, may be immediately displayed. Alternatively, a navigation region configured to enable the range of corresponding information to be accurately selected may be displayed. The navigation region may be configured such that content, such as the fields, categories or the like of specific information, such as an advertisement, shopping, or the like, is included and a user can select the content. The navigation region may be located in the left side, right side, or upper end of a mobile screen. Furthermore, when a user activates an ON state by pressing the button configured to invoke specific information, such as an advertisement, shopping, or the like, while using existing content, specific information, such as an advertisement, shopping, or the like, associated with the corresponding content may be displayed in the form of a new screen (layer) over a content region.

Unlike a method by which a user selects specific information, such as an advertisement, shopping, or the like, by means of the information display button 116 equipped with a hardware function, a method of selecting specific information, such as an advertisement, shopping, or the like, by means of the software information display button 116 may be configured to invoke specific information and an advertisement through the action of locating a button in the left or right region of a home button disposed at the lower end of mobile terminal 110 or an upper end bezel portion, the action of tapping on an edge or back portion twice, or the like.

According to another software method or a UI/UX method, a user may invoke specific information, such as an advertisement, shopping, or the like, by shaking the mobile terminal 110 used by the user in a lateral or vertical direction two or more times. Specific information may be invoked using a method of hitting the mobile terminal 110 one or more times. Furthermore, the button may be added to a specific region, such as the upper end, the lower end or the like, of a search engine app, such as NAVER, Google, or the like. An app configured to run an advertisement screen may be installed. An advertisement button may be added to the keyboard of a smartphone.

An additional software method provides a function capable of invoking information, such as an advertisement, shopping, or the like, to a region where a functional function, such as a copy function, a translation function, or the like, is executed by dragging a word, a sentence, an image, or the like by means of a drag function provided on a mobile terminal so that the information desired by a user can be directly invoked without automatically extracting a keyword.

Furthermore, there is a method in which when a user slides in one direction on a display screen while viewing content, a screen configured to invoke information, such as an advertisement, shopping, or the like, is displayed and a selection is made, and a method in which information, such as an advertisement, shopping, or the like, can be invoked on a display screen sliding from the upper end of a mobile device in a downward direction or a display screen sliding from the lower end of a mobile display in an upward direction.

The information control system operates inside the mobile terminal 110 to invoke specific information, such as an advertisement, shopping, or the like. The information control system operates at all times inside the mobile terminal 110 of a user, detects content being used by the user, and transmits the detected content to the information search relay server 120. In this case, the user also receives information from which a keyword can be extracted from the mobile terminal so that the search relay server extracts corresponding content (a web URL, an image, a document, or the like). The information from which a keyword can be extracted is commonly based on a method of retrieving a keyword by means of the keyword search box of the terminal of the user and requesting the keyword or a method of reducing an extraction range via a category and curation method and extracting a keyword via a common content-based analysis technique. The extracted keyword is stored in the information search relay server, and is transmitted to and stored in the mobile terminal 110 of the user, and thus the information control system may use the extracted keyword.

The information control system may receive a derived principal keyword for the text or image of content being used by a user from the information search relay server, and may display specific information, such as an advertisement, shopping, or the like, related to the derived keyword on a user screen when the user invokes the information control system by means of the hardware or software method.

The information control system inside the mobile terminal 110 may be a system which operates at all times or is activated by means of the hardware or software method and which analyzes the information of the mobile terminal 110 of the user. The information control system may function to analyze content being used by a user, to derive a principal keyword based on the analysis, and to transmit the derived keyword to the information search relay server 120. Furthermore, the information control system may remove an existing advertisement, shopping information, or the like compulsorily displayed on the mobile screen of a user via a specific action, such as the action of clicking the button configured to invoke specific information, such as an advertisement, shopping, or the like, two or more times, the action of shaking the mobile terminal 110 in a vertical direction, the action of shaking the mobile terminal 110 in a lateral direction, or the like.

For example, the information control system may derive and display an advertisement based on a keyword for which a search is attempted when a user uses a search service, such as a Google service or the like, via a mobile device, or may additionally collect a specific keyword from derived content and display an advertisement related to the specific keyword (①). Furthermore, when the keyword and image of content being viewed by a user are selected and the button is clicked, an advertisement or shopping information related to the keyword may be viewed (②). Furthermore, when a user clicks an advertisement display button while viewing the content of a specific news service provider via a mobile device, the principal keywords of the corresponding content may be arranged and displayed, or an advertisement associated with the corresponding content may be displayed (③). When a user uses a specific shopping mall, a price comparison or curation service may be used by searching for the same or similar products through the click of a shopping-related button (④).

When it is difficult to focus on content due to an advertisement exposed during the use of the content, the advertisement may be removed via a specific action, such as the action of clicking the button configured to invoke specific information, such as an advertisement, shopping, or the like, or clicking the bottom two or more time, the action of shaking the mobile terminal 110 in a vertical direction, the action of shaking the mobile terminal 110 in a lateral direction, or the like.

When a user invokes the information control system and selects a derived keyword, the information control system may receive specific information, an advertisement, and shopping information related to the keyword from the information search relay server 120, and may transfer them to the user. When a user invokes the information control system and requests the deletion of the advertisement region of specific content, the advertisement region may be deleted, and existing content may be continuously provided to the user.

The information search relay server 120 may search for specific information, such as an advertisement, shopping (a product), or the like, based on received keywords, may transfer the found information to the user mobile terminal 110, and may display the corresponding information to the user when the user performs invocation via the specific action of the mobile terminal 110, such as the click of the information display button 116 using the hardware method or the click of the information display button 116 using the software method.

The information search relay server 120 exposes specific information or a specific advertisement desired by a user by analyzing various cases, such as a case ① where the user clicks a specific keyword or banner or the like on a specific screen, a case ② where the user selects a keyword within a screen and clicks the button, a case ③ where an image is present in a screen, etc.

The information search relay server 120 possesses the search system configured to search for specific information, such as an advertisement, shopping, or the like. The information search relay server 120 provides a platform configured to link mobile users to advertisements related to content so that the mobile users can easily view the advertisements to advertisers who advertise, thereby more efficiently providing advertisement marketing and providing the information of the advertisements provided by the advertisers to the users. Furthermore, advertisers who desire to place advertisements regarding search services such as Google, Baidu, etc., various types of content, various types of shopping malls, or the like may register advertisement information and keywords corresponding to advertisements in the information search relay server 120, and thus the corresponding advertisements may be transferred to users upon the invocation of the users, thereby providing the advertisements to a plurality of users.

In the case of a conventional advertisement platform, an advertisement is provided through a large number of steps, and thus advertising cost-effectiveness thereof is low. In the case of the present invention technology, advertisers can directly register advertisements and directly transfer them to users, and thus fast advertisement effects may be acquired for low advertising costs. Furthermore, although advertisements and shopping services have been monopolized by professional Internet companies, such as NAVER, Google, Amazon, Alibaba, etc., so far, a new powerful platform operator may appear via the present invention. Regardless of an operator who operates the platform, a hardware company may also make profits through a contract with a hardware company, Samsung, Apple, or the like.

Furthermore, a social network platform (SNS) and the present advertisement platform may be operated in conjunction with each other. Accordingly, a user who desires to receive specific information, such as an advertisement, shopping, or the like, may be allocated an affiliate ID by the advertisement platform, may receive information to be provided, and may provide the received specific information, such as an advertisement, shopping or the like, to another user via an SNS platform in conjunction with an SNS-affiliated service. This provides a profit model in which when a person uses corresponding information, a predetermined proportion of advertising fees provided by an advertiser registered in the advertisement platform is distributed to the user via an SNS-affiliated service.

As another function, the information control system has the function of operating in a short-distance wireless communication environment, such as a Bluetooth or WIFI environment, or the like. The conventional advertisement technologies automatically expose an offline advertisement to the terminal of a user regardless of the request of the user, thus to cause inconvenience to the user when the user passes or visits a specific shop in an offline environment for the purpose of the grafting of O2O technology, or do not support a control means when a user desires to receive specific information, such as an advertisement, shopping, or the like, only from a specific shop. The information control system provides the function of compensating for the above disadvantage to a user.

The information control system provides the function of deleting an advertisement in order to prevent the advertisement from being received offline, such as the above-described function, and may also make a setting such that an advertisement can be received only from a specific shop.

In other words, when an advertisement appears upon a visit to an offline shop, the advertisement may be deleted using a method, such as the above-described deletion method. Upon a visit to a specific shop, the specific information, such as an advertisement, shopping, or the like, of the corresponding shop may be received by activating the information display button 116.

In this case, the owner of the corresponding offline shop registers corresponding related information, such as an advertisement, shopping, or the like, in the information search relay server 120, and provides specific information to a user.

Figure 4:
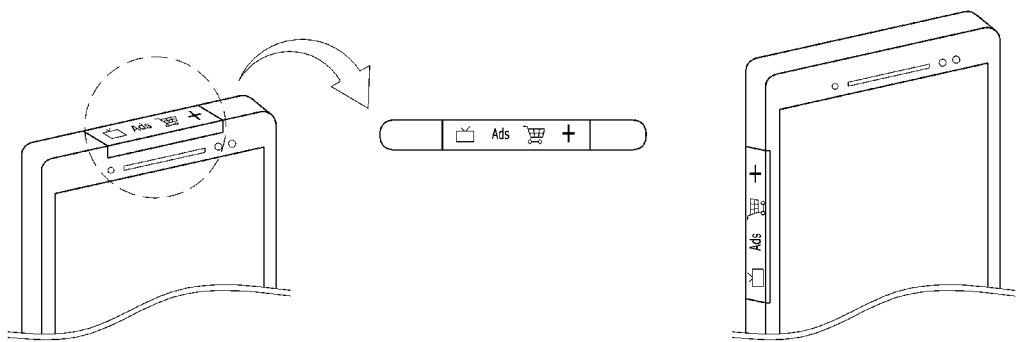
FIG. 4 is a view showing the display information display button of the mobile terminal according to an embodiment of the present invention.

FIG. 4 is a view showing the display information display button 116 of the mobile terminal 110 according to an embodiment of the present invention.

The information display button 116 includes an advertisement display button, and a shopping display button. A separate display, other than the basic display screen of the mobile terminal 110, is disposed on a top or side surface or bezel, and the separate display outputs the information display button 116 including the advertisement display button and the shopping display button, and receives the touch or press input of a user.

The information display button 116 may be implemented as a separate display located on a top or side surface or bezel, and may be a button disposed on the top or side surface or bezel of the mobile terminal 110 and configured to be pressed.

The separate display may include a shopping-related shopping basket button in addition to the advertisement display button and the shopping display button. Meanwhile, a user may set the functions of the buttons.

Figure 5:
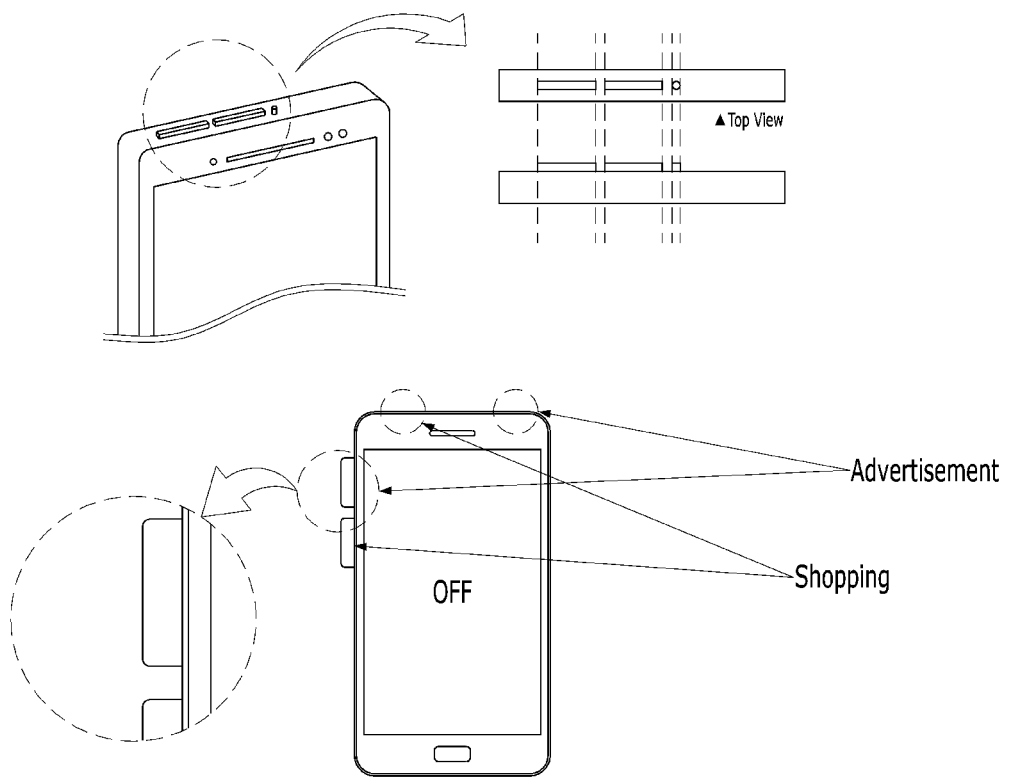
FIG. 5 is a view showing the configuration of the information display button of the mobile terminal according to an embodiment of the present invention.

FIG. 5 is a view showing the configuration of the information display button 116 of the mobile terminal 110 according to an embodiment of the present invention.

The mobile terminal 110 includes the information display button 116, and the mobile terminal 110 may transmit information to the information relay server functioning as a server.

The button configured to view specific information, such as an advertisement, shopping, or the like, may be mounted in the mobile terminal 110 which is used by a user. The button may be mounted in the specific region, such as the left side, right side, or upper end, of the mobile terminal 110, and the specific region may be a bezel portion or edge. The corresponding button includes ON/OFF functions. When a user switches the information display button 116 to an ON state by pressing it, the user can view specific information, such as an advertisement, shopping, or the like. Specific information, such as an advertisement, shopping, or the like, which may appear when the information display button 116 is clicked enables a system operating in conjunction with the information display button 116 to analyze a corresponding screen based on the mobile screen being currently viewed by a user, and thus related information may be provided.

According to a method of viewing specific information, such as an advertisement, shopping, or the like, on the mobile terminal 110 used by a user, other than the method of providing a button, specific information, such as an advertisement, shopping, or the like, is invoked by running an advertisement invocation function, a shopping invocation function, or the like, which is similar to a functional function which is invoked when a word, sentence, or image is dragged, e.g., a copy function, a sharing function, a translation function, or the like, in a software fashion by means of a drag function in an operating system which drives the mobile terminal, thereby providing related information.

The information display button 116 is mounted in the mobile terminal 110 so that when a user desires to view specific information, such as an advertisement, shopping, or the like, the user can open a new screen (layer) while maintaining an existing content screen without change and can separately view specific information, such as an advertisement, shopping, or the like, or activate specific information, such as an advertisement, shopping, or the like.

Figure 6:
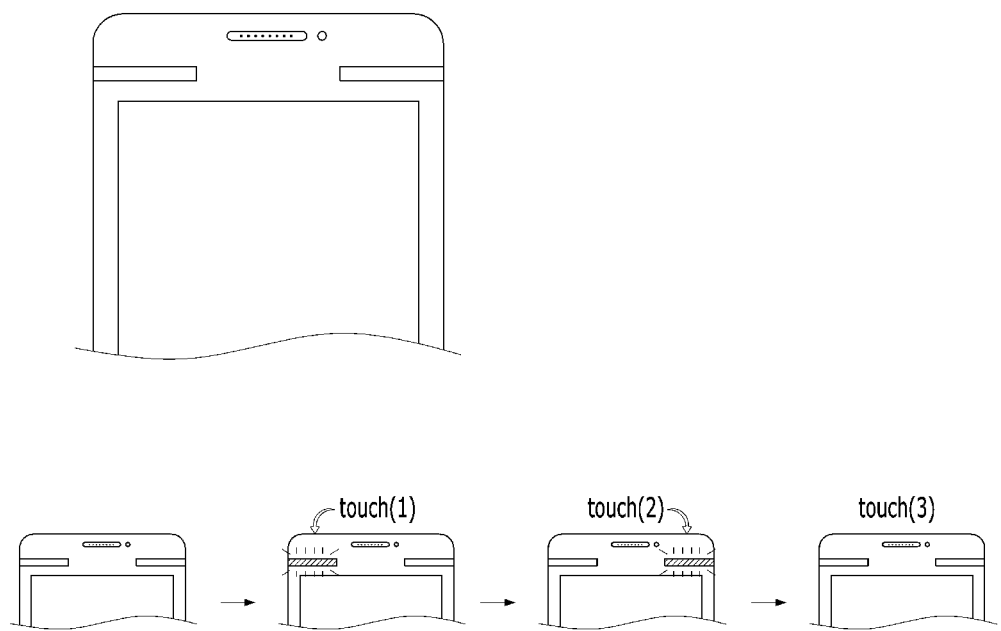
FIG. 6 is a view showing an advertisement information lamp and a shopping information lamp according to an embodiment of the present invention.

FIG. 6 is a view showing an advertisement information lamp and a shopping information lamp according to an embodiment of the present invention.

The mobile terminal 110 may include the advertisement information lamp and the shopping information lamp. The mobile terminal 110 may perform control such that whether information output by the information output unit 114 is advertisement information or shopping information is indicated via the advertisement information lamp or shopping information lamp.

The information output by the information output unit 114 may include advertisement information or shopping information. Whether information being viewed by a user is an advertisement or shopping is indicated via the advertisement information lamp or shopping information lamp, and thus the user may rapidly determine whether information being current viewed by the user is advertisement information or shopping information.

When a user desires to view shopping information while viewing advertisement information, the user may view shopping information by touching the shopping information lamp.

For example, when a user touches the shopping information lamp in order to view shopping information in the state in which the advertisement information lamp has been turned on because the user is viewing advertisement information, the user may immediately view the shopping information. If a user does not desire to view advertisement information any longer while viewing the advertisement information, the advertisement information may not be provided any longer by touching the advertisement information lamp. Furthermore, when a user desires to stop the viewing of shopping information, the viewing of the shopping information may be stopped by touching the shopping information lamp in the same manner. The advertisement information lamp and the shopping information lamp may provide information about whether a user is currently viewing advertisement information or shopping information, and may also provide ON and OFF functions in response to the touches thereof.

Figure 7:
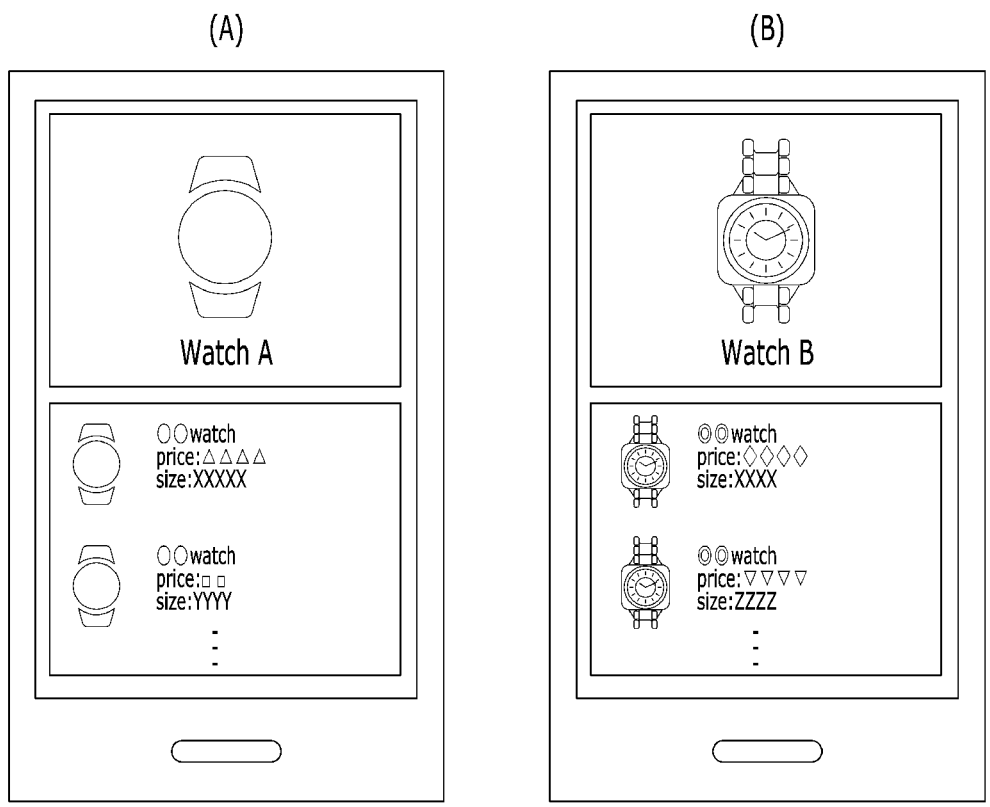
FIG. 7 is a view showing a segment screen output by an information output unit according to an embodiment of the present invention.

FIG. 7 is a view showing a segment screen output by the information output unit 114 according to an embodiment of the present invention.

The information output unit 114 outputs keyword-related information, received by the information reception unit 113, onto the display screen of the mobile terminal 110.

The information output unit 114 may segment the display screen of the mobile terminal 110 or construct a popup screen, and may output the keyword-related information while maintaining content output.

The keyword extraction unit 111 may extract a keyword for part of content being displayed on the screen of the mobile terminal 110, and, when part of content being displayed on the display screen of the mobile terminal 110 is changed, may extract a keyword for the changed part and output keyword-related information onto the segment screen or popup screen output by the information output unit 114.

The information output unit 114 may output advertisement information or shopping information onto a segment display screen or popup screen while maintaining a screen being viewed by a user. Whenever content being viewed by a user is changed, advertisement information or shopping information may be updated on a segment screen or popup screen according to the changed content, and thus the user may view advertisement information or shopping information in real time.

For example, in the case where a user is viewing a blog on which various watches have been posted, when watch A is displayed on the screen of the mobile terminal 110 of a user, shopping information related to watch A may be output onto a segment or popup screen. Meanwhile, when watch B is displayed on the screen of the user by lowering a scroll bar, shopping information related to watch B may be made to be immediately output. This enables the user to view information on a segment screen or popup screen in real time without viewing watch A and separately making a search for its price or specifications, thereby reducing time and also eliminating inconvenience related to a separate search.

The keyword extraction unit 111 extracts a keyword entered into a search box by a user, extracts a keyword by analyzing content extracted via the keyword entered into the search box by the user, and outputs keyword-related information onto the segment screen or popup screen output at the information output step.

For example, when a user enters the keyword "jeans" into a search engine, the keyword extraction unit may extract a keyword regarding "jeans," and may display content. Furthermore, the keyword extraction unit 111 may analyze a search result screen extracted when the keyword "jeans" is search for in the search engine, and advertisement information or shopping information may be viewed via the results of the analysis in real time.

The keyword extraction unit 111 may extract a keyword related to information about part of content dragged by a user. When part of the information dragged by the user is changed, a keyword may be extracted by analyzing the changed information, and keyword-related information may be output onto a segment screen or popup screen output by the information output unit.

The dragged information may be a word, a sentence, an image, a moving image, a URL, or the like. The keyword extraction unit may provide the function of invoking information, such as an advertisement, shopping, or the like, onto a region where a functional function, such as a copy function, a translation function, or the like, is executed by dragging a word, a sentence, an image, or the like by means of a drag function provided by the mobile terminal, thereby enabling a user to directly invoking desired information without automatically extracting a keyword.

For example, when a user drags desired information while viewing content on a mobile terminal, selectable functions, such as a copy function, a cut function, a translation function, etc., are generally provided for the dragged information. By providing an icon or button configured to perform the same function as the information display button as such a function, the function of automatically and immediately moving to advertisement information or shopping information when a user drags content may be provided.

Figure 8:
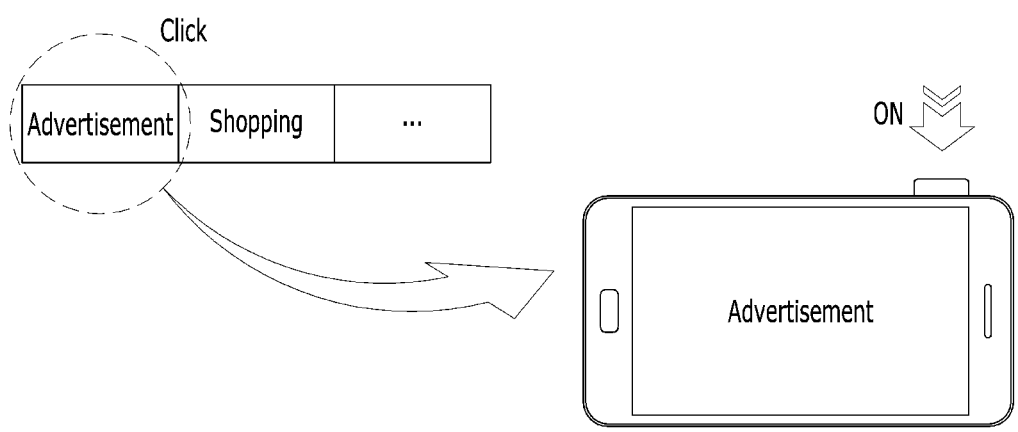
FIG. 8 is a view showing the configuration of the navigation of the mobile advertisement providing system according to an embodiment of the present invention.

FIG. 8 is a view showing the configuration of the navigation of the mobile advertisement providing system according to an embodiment of the present invention.

When the information display button 116 of the mobile terminal 110 is clicked, specific information, such as an advertisement, shopping, or the like, may be made to be immediately viewed, or a navigation region configured to enable the range of corresponding information to be accurately selected may be made to be viewed. The navigation region may be configured such that content, such as the fields, categories or the like of specific information, such as an advertisement, shopping, or the like, is included and users can select the content. The navigation region may be located in the left side, right side, or upper end of the mobile screen. Furthermore, when a user activates an ON state by pressing the button configured to invoke specific information, such as an advertisement, shopping, or the like, while using existing content, specific information, such as an advertisement, shopping, or the like, associated with the corresponding content may be viewed in the form of a new screen (layer) over a content region.

The categories displayed in the navigation region may be shopping items, such as travel, books, medical care, marts, tickets, etc., or may be search engines, such as Google, NAVER, etc. Furthermore, the categories may be specific shopping malls, such as Auction, ebay.com, Tmall.com, amazon.com, etc. A user may set the categories to desired categories.

Conventionally, when a plurality of advertisers registers advertisements in service providers, such as Google, Baidu, and Apple markets, etc., visitors view the advertisements. This is disadvantageous in that an advertiser needs to register an advertisement in a plurality of service providers, an advertisement is not exposed when surfing is performed in a service provider in which the advertisement has not been registered, and entities, other than companies providing advertisements, do not provide advertisements. In contrast, the mobile advertisement providing system according to the present invention enables a visitor to view an advertisement notwithstanding that a content provider, an advertisement agent, and an online service provider have not participated in the exposure of the advertisement, and also enable a person desiring to view an advertisement to view relevant advertisement regardless of the display of an advertisement by a corresponding service provider. Furthermore, the mobile advertisement providing system according to the present invention is advantageous in that an advertisement may be exposed during the service of a content provider which an advertiser does not know, the platform may be used only by adding a function, such as a button, a sensor, or the like, in association with smartphone manufacturers, and implementation is simple because only the participation of an OS provider in the construction of the system and the implementation of an advertisement registration platform by an advertisement platform provider are required. This enables the whole world to use the single same advertisement platform, so that advertisers can easily perform advertisement and the effect in which visitors can view desired relevant advertisements, as in shopping, can be achieved. Furthermore, there is proposed the platform in which image registrants link advertisements, products, etc., related to corresponding content, to various pieces of content, including not only news, products, text information, etc. but also YouTube, personal broadcast images, etc., via the advertisement platform and the content registrants receive part of advertising fees as their profits when visitors perform the action of clicking advertisements, the action of purchasing products, the action of downloading apps (applications), etc. Furthermore, a social network service (SNS) platform and the present advertisement platform are operated in conjunction with each other, so that a user who provides specific information, such as an advertisement, shopping, or the like, to other users may be allocated an affiliate ID by the advertisement platform, may receive information to be provided, and may provide specific information, such as an advertisement, shopping, or the like, to the other users via an SNS platform used by the user in association with an SNS-affiliated service. This provides a profit model in which when a person uses corresponding information, a predetermined proportion of advertising fees provided by an advertiser registered in the advertisement platform is distributed to the user via an SNS-affiliated service.

Furthermore, when a physical advertisement or shopping button is clicked on a content page, such as YouTube, Google search results, Amazon, Taobao, Facebook, or the like, the advertisement or a product is displayed. A person's advertisement, product, or the like may be registered by clicking a link, such as an advertisement registration, a product link, or the like, present in a specific portion, such as an upper end, or the like. Upon registration, an exposure target, a country, a language, an area, a price per exposure/click, etc. may be set. When an advertisement, a product, or the like is registered or linked, a predetermined amount of money may be deposited in advance via a credit card, PayPal, or the like. A function, such as a button, a touch sensor, or the like, is mounted in the terminals of all manufacturers, so that advantages arise in that an platform operator does not need to perform promotion required for the invitation and exposure of advertisements and an advertisement and shopping platform which can be utilized by anybody over the world can be constructed and operated.

Figure 9:
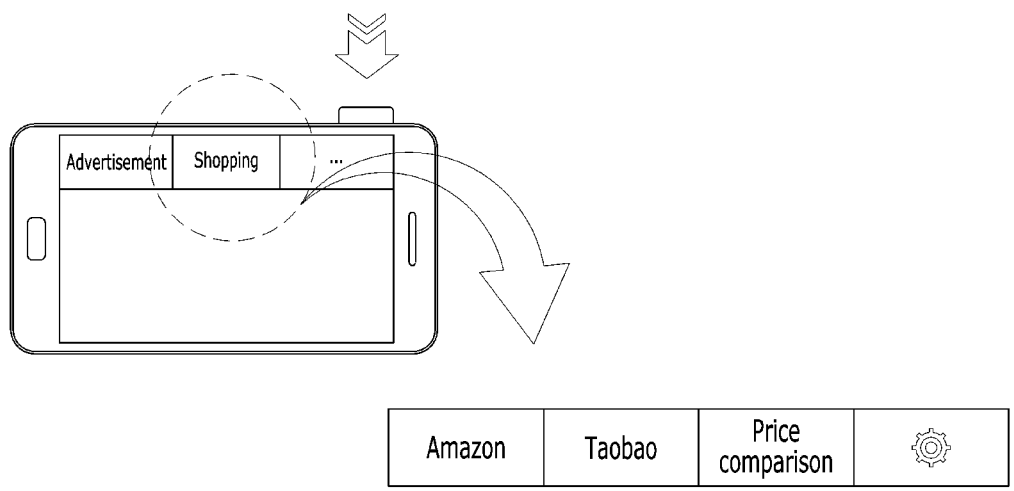
FIG. 9 is a view showing the category configuration of the navigation of an advertisement platform system according to an embodiment of the present invention.

FIG. 9 is a view showing the category configuration of the navigation of an advertisement platform system according to an embodiment of the present invention.

When the information display button 116 of the mobile terminal 110 is clicked, specific information, such as an advertisement, shopping, sharing, or the like, may be made to be viewed, and a navigation region configured to enable the range of the corresponding information to be accurately selected may be made to be viewed.

The navigation region includes the function of communicate content being currently viewed by a user via a social network service (SNS) configured to share information such as Facebook, Twitter, Instagram, or the like, or a messenger such as Kakao Talk, Line, Whatsapp, or the like. The navigation region may provide a service configured to share content with another user.

Furthermore, content being currently viewed by a user may be shared via a message board of Daum Cafe, NAVER Cafe, Flicker, TED, Biadu Tieba, or the like, may be transmitted to an e-mail address or phone number stored in the directory of the mobile terminal 110, and may be stored in an application configured to store data, such as the note pad, calendar or the like of the mobile terminal 110.

Furthermore, in the category configuration of the navigation, a category may be added by a user, an existing application being used may be added, invoked and used, or a service provided by the information search relay server 120 may be additionally requested and used.

For example, when a user desires to use a specific functional element such as chatting, there may be used a method of adding a chat application (NateOn, Line, Kakao Talk, Skype, or the like), chiefly used by the user, to a navigation category region, or a method of downloading a chat service provided by the information search relay server 120, installing the chat service on the terminal, and using the chat service.

The information search relay server 120 includes the functions of upgrading a service used in the advertisement platform of the terminal, and providing a chat, an electronic payment service, an office, or the like, as well as the function of linking a user to the advertisement of an advertiser.

Figure 10:
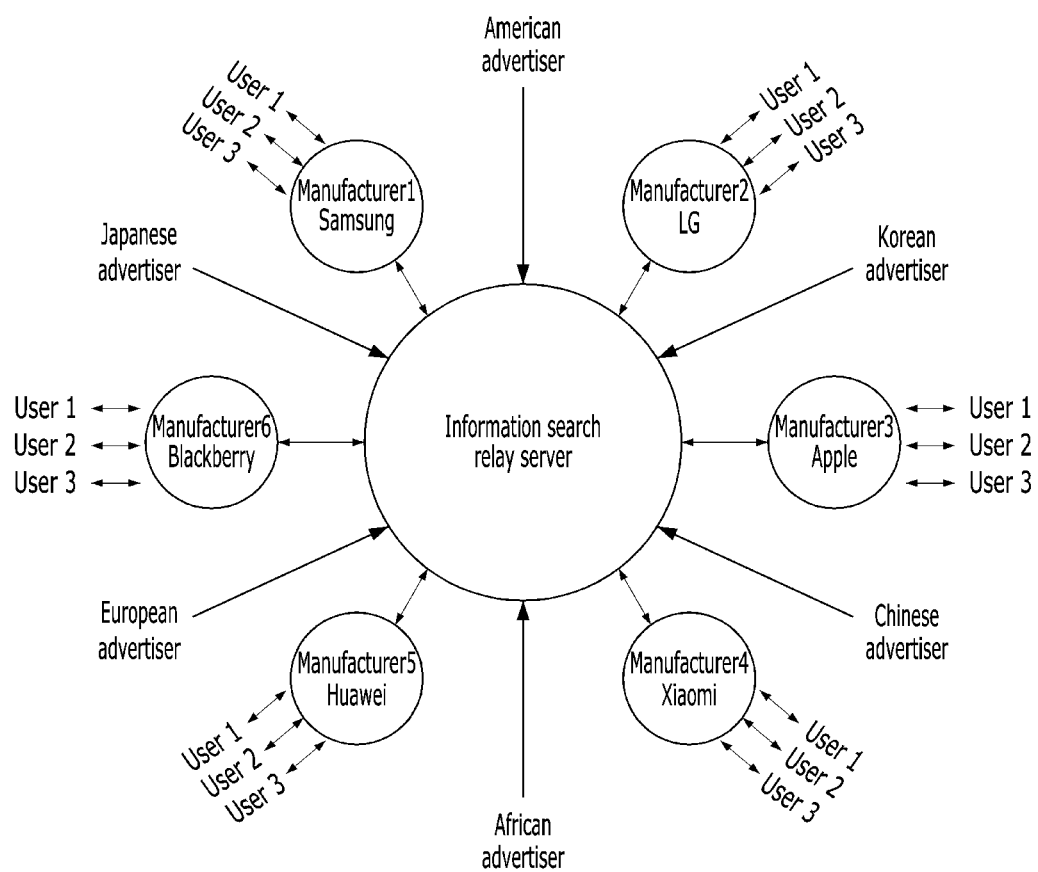
FIG. 10 is a view showing the configuration of an information search relay server according to an embodiment of the present invention.

FIG. 10 is a view showing the configuration of the information search relay server 120 according to an embodiment of the present invention.

The information search relay server 120 possesses the search system configured to search for specific information, such as an advertisement, shopping, or the like. The information search relay server 120 provides the platform configured to link a mobile user to an advertisement related to content so that the user can easily view the advertisement to an advertiser who advertises, thereby more efficiently providing advertisement marketing and providing the information of advertisements provided by advertisers to users.

Furthermore, an SNS-affiliated service which may be provided in conjunction with an SNS is provided, and thus a user publicizes specific information, such as an advertisement, shopping, or the like, to other users, thereby enabling the user to receive fee profits from advertisers.

The terminals of manufacturers, such as Samsung, LG, Apple, Xiaomi, Huawei, etc., all over the world may be connected to the information search relay server 120. When all advertisers, product vendors, specific information providers, etc. all over the world post advertisements or specific information on the information search relay server 120, all terminal users all over the world may view specific information, such as advertisements, shopping, and the like, which is provided by the platform.

As described above, there is provided the effect in which the advertisers, the product vendors, the specific information providers, etc. may perform promotion to a plurality of users in the form of a single channel.

Furthermore, this channel may be used in conjunction with an SNS, so that a user forms a community along with other users, may leave a note on viewed content, may store viewed content and put it into data, or may use the channel as a community for sharing information through the exchange of opinions with other persons. Furthermore, a user may directly communicate with an advertiser or shopping company, and thus the user may use a service or purchase a product and may have a consultation regarding it. There may be provided the effect in which an SNS environment different from an existing one may be constructed in such a way that a user obtains the role of publicizing an advertisement and directly acts as an affiliate, and so forth.

Figure 11:
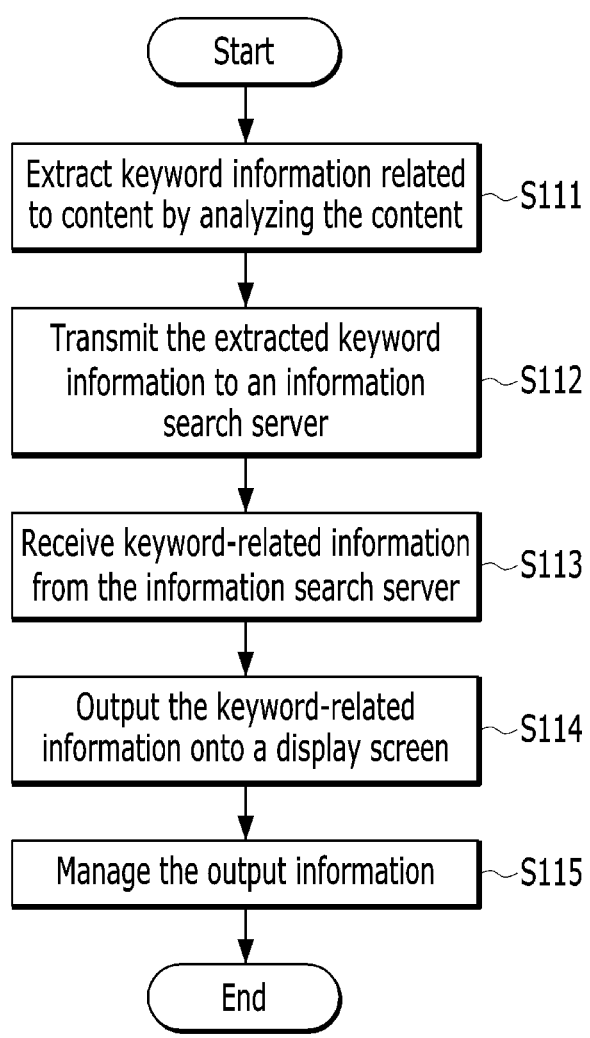
FIG. 11 is a flowchart showing the flow of a mobile advertisement providing method according to an embodiment of the present invention.

FIG. 11 is a flowchart showing the flow of a mobile advertisement providing method according to an embodiment of the present invention.

In a method for providing advertisement information in the mobile terminal 110 including the information display button 116, the information display button 116 includes an advertisement display button and a shopping display button. A separate display, other than the basic display screen of the mobile terminal 110, is disposed on a top or side surface. The separate display outputs the information display button 116 including an advertisement display button and a shopping display button, and receives the touch input of a user.

The information display button 116 may be implemented as a separate display located on a top or side surface, and may be a button disposed on the top or side surface of the mobile terminal 110 and configured to be pressed.

Step S111 is performed in the mobile terminal 110. At step S111, content displayed on the mobile terminal 110 is detected and analyzed, and keyword information related to the content is extracted.

The content displayed on the mobile terminal 110 may be any website or application which can be displayed on a mobile device. Related keyword information is extracted by analyzing text or an image included in a website or application which is being viewed by a user.

At step S112, the keyword information extracted at step S111 is transmitted to the information search relay server 120.

At step S113, keyword-related information is requested from the information search relay server 120 in response to the input of the information display button 116, and the keyword-related information is received from the information search relay server 120.

The information search relay server 120 may directly receive advertisement information and shopping information from an advertiser, and the received advertisement information and shopping information may include display information and link information which will be output at step S114.

The information search relay server 120 possesses the search system configured to search for specific information, such as an advertisement, shopping, or the like. The information search relay server 120 provides a system configured to link mobile users to advertisements related to content so that the mobile users can easily view the advertisements to advertisers who advertise, thereby more efficiently providing advertisement marketing and providing the information of the advertisements provided by the advertisers to the users. Furthermore, advertisers who desire to place advertisements regarding search services such as Google, Baidu, etc., various types of content, various types of shopping malls, or the like may register advertisement information and keywords corresponding to advertisements in the information search relay server 120, and thus the corresponding advertisements may be transferred to users upon the invocation of the users, thereby providing the advertisements to a plurality of users.

There is included an information verification step at which the information search relay server 120 verifies advertisement information, shopping information, or the like received from an advertiser. At the information verification step, whether display information input by an advertiser matches link information is determined. Furthermore, whether the link information includes malicious code is determined.

When an advertiser directly inputs advertisement, shopping information, or the like to the information search relay server 120, the advertiser may input advertisement and shopping information including a keyword or description different from an advertisement target product or advertisement target information in order to enable the advertisement or the like to be searched for by or exposed to a large number of persons. There is required a means for verifying the wrong information, and the wrong information is verified at the information verification step. Furthermore, verification may be performed to prevent the mobile terminal 110 of a user from being infected with malicious code or a computer virus by determining whether malicious code is included in the link information.

At step S114, the keyword-related information received at step S113 is output onto the display screen of the mobile terminal 110.

At step S114, the display screen of the mobile terminal 110 may be segmented or a popup screen may be constructed, and the keyword-related information may be output while maintaining content output.

At step S111, a keyword for part of content displayed on the screen of the mobile terminal 110 may be extracted, and, when part of the content displayed on the display screen of the mobile terminal 110 is changed, a keyword for the changed part may be extracted and keyword-related information may be output onto the segment screen or popup screen output at step S114.

At step S114, advertisement information or shopping information may be output onto the segment display screen or popup screen while maintaining a screen being viewed by the user. Whenever the content being viewed by the user is changed, the advertisement information or shopping information may be updated on the segment screen or popup screen in response to the changed content, and thus the advertisement information or shopping information may be viewed in real time.

The mobile terminal 110 may include an advertisement information lamp and a shopping information lamp. The information output unit 114 may perform control so that whether output information is advertisement information or shopping information is indicated via the advertisement information lamp or the shopping information lamp.

The information output at step S114 may separately include advertisement information and shopping information. Whether information being viewed by a user is advertisement information or shopping information may be indicated via the advertisement information lamp or shopping information lamp, and thus the user may more conveniently and rapidly determine whether information being currently viewed by the user is advertisement information or shopping information.

An advertiser may directly input the advertisement information and shopping information output at step S114 via the information search relay platform. The advertiser may provide both display information including a keyword, an image, and/or the like adapted to show advertisement or shopping information and link information guiding movement to the advertisement or shopping information to a user.

At step S115, the information output at step S114 is managed.

At step S115, a user may select and delete deletion target information from the advertisement information and shopping information output at step S115, a reason for the deletion may be received, and whether to block the advertisement information and the shopping information may be determined based on the received reason for the deletion and information about the number of deletions.

A user may select and delete the advertisement information or shopping information output at step S114, and may input a reason for the deletion. When the reason for the deletion indicates that the output information does not match information or a product desired by the user, the corresponding advertisement information and shopping information may be blocked. Furthermore, the number of deletions is a basis for the determination of whether to block. When the number of deletions is large, the corresponding information has strong possibility of being information not desired by a user. Accordingly, the priority of the corresponding information is lowered, and thus the corresponding information may become data which is not preferentially viewed to a user. The mobile advertisement providing system according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based on only the described embodiments, but should be determined based on not only the attached claims but also equivalents to the claims.

The present invention relates to a mobile advertisement providing system, and more specifically to technology for a mobile advertisement providing system which includes an information display button and displays content and advertisement information provided onto a current screen in response to the manipulation of the information display button.

The invention claimed is:

1. A mobile advertisement providing system, comprising:
a mobile terminal configured to include an information display button, and comprising a keyword extraction unit;
the keyword extraction unit configured to be driven in the mobile terminal, to recognize and analyze content displayed on the mobile terminal, and to extract keyword information related to the content displayed on the mobile terminal by detecting and analyzing the content, the keyword extraction unit extracting a keyword for part of content displayed on a display screen of the mobile terminal, and, when part of content displayed on the display screen of the mobile terminal changes, extracting a keyword for the changed part of the content, or extracting a keyword by analyzing content extracted via a keyword entered into the search box by the user;
a keyword transmission unit configured to transmit the keyword information, extracted by the keyword extraction unit, to an information search relay server;
an information reception unit configured to request keyword-related information from the information search relay server in response to pressing of the information display button, and to receive the keyword-related information from the information search relay server;
an information output unit configured to output the keyword-related information, received by the information reception unit, onto the display screen of the mobile terminal; and
an information management unit configured to manage the information output by the information output unit,
wherein the information output by the information output unit is advertisement information or shopping information, and the information display button includes an advertisement display button or a shopping display button,
wherein the information display button comprises a software information display button, a separate display or physical button disposed on a side or top surface of the mobile terminal,
wherein the information output unit is further configured to output a navigation region configured to enable a user to select one or more of an advertisement, a shopping item, a search engine, a specific shopping mall, a social network service, and a messenger function when the information display button is pressed,
wherein the information management unit provides original content from one provider and obtains results from a different provider,
and wherein the outputting the keyword-related information is performed by the mobile advertisement providing system different from a content provider that provides the content displayed on the mobile terminal as the information display button is pressed.

2. The mobile advertisement providing system of claim 1, wherein the navigation region comprises a category region related to at least one of function or service comprising one or more of a shopping item, a search engine, a specific shopping mall, a social network service, and a messenger function.

3. The mobile advertisement providing system of claim 1, wherein:

the information search relay server receives the advertisement information and the shopping information directly from an advertiser; and
the received advertisement information and shopping information include display information and link information to be output by the information output unit.

4. The mobile advertisement providing system of claim 1, wherein the information output unit segments the display screen of the mobile terminal or constructs a popup screen, and outputs the keyword-related information while maintaining output of the content.

5. The mobile advertisement providing system of claim 1, wherein:
the keyword extraction unit extracts a keyword for information about part of the content dragged by a user; and
the information output unit outputs advertisement information and shopping information for the information dragged by the user.

6. A method for providing advertisement information in a mobile terminal including an information display button, the method comprising:
a keyword extraction step performed in the mobile terminal using a keyword extraction unit located on the mobile terminal and extracting keyword information related to content displayed on the mobile terminal by detecting and analyzing the content, the keyword extraction unit extracting a keyword for part of content displayed on a display screen of the mobile terminal, and, when part of content displayed on the display screen of the mobile terminal changes, extracting a keyword for the changed part of the content, or extracting a keyword by analyzing content extracted via a keyword entered into the search box by the user;
a keyword transmission step of transmitting the keyword information, extracted at the keyword extraction step, to an information search relay server;
an information reception step of requesting keyword-related information from the information search relay server in response to pressing of the information display button and receiving the keyword-related information from the information search relay server;
an information output step of outputting the keyword-related information, received at the information reception step, onto the display screen of the mobile terminal; and
an information management step of managing the information output at the information output step,
wherein the information output at the information output step is advertisement information or shopping information,
wherein the information display button includes an advertisement display button or a shopping display button,
wherein the information output step includes outputting a navigation region configured to enable selection of a range of the advertisement information or shopping information when the advertisement display button or shopping display button is pressed,
wherein the information display button comprises a software information display button, a separate display or physical button disposed on a side or top surface of the mobile terminal,
wherein the navigation region is further configured to enable a user to select one or more of an advertisement, a shopping item, a search engine, a specific shopping mall, a social network service, and a messenger function, wherein the information management unit provides original content from one provider and obtains results from a different provider, and wherein the outputting the keyword-related information is performed by the mobile advertisement providing system different from a content provider that provides the content displayed on the mobile terminal as the information display button is pressed.

7. The method of claim 6, wherein the navigation region comprises a category region related to at least one of function or service comprising one or more of a shopping item, a search engine, a specific shopping mall, a social network service, and a messenger function.

8. The method of claim 6, wherein:
the information search relay server receives the advertisement information and the shopping information directly from an advertiser; and
the received advertisement information and shopping information include display information and link information to be output at the information output step.

9. The method of claim 6, wherein the information output step includes outputting the keyword-related information unit onto a segment display screen of the mobile terminal or a popup screen.

10. The method of claim 6, wherein:
the keyword extraction step includes extracting a keyword for information about part of the content dragged by a user; and
the information output step includes outputting advertisement information and shopping information for the information dragged by the user.

11. A non-transitory computer readable storage medium storing one or more programs, the one or more programs comprising instructions which, when executed by a mobile terminal including an information display button, cause the mobile terminal device to perform:
a keyword extraction step performed in the mobile terminal using a keyword extraction unit located on the mobile terminal and extracting keyword information related to content displayed on the mobile terminal by detecting and analyzing the content, the keyword extraction unit extracting a keyword for part of content displayed on a display screen of the mobile terminal, and, when part of content displayed on the display screen of the mobile terminal changes, extracting a keyword for the changed part of the content, or extracting a keyword by analyzing content extracted via a keyword entered into the search box by the user
a keyword transmission step of transmitting the keyword information, extracted at the keyword extraction step, to an information search relay server;
an information reception step of requesting keyword-related information from the information search relay server in response to pressing of the information display button and receiving the keyword-related information from the information search relay server;
an information output step of outputting the keyword-related information, received at the information reception step, onto the display screen of the mobile terminal; and
an information management step of managing the information output at the information output step,
wherein the information output at the information output step is advertisement information or shopping information,
wherein the information display button includes an advertisement display button or a shopping button,
wherein the information output step includes outputting a navigation region configured to enable selection of a range of the advertisement information or shopping information when the advertisement display button or shopping display button is pressed,
wherein the information display button comprises a software information display button, a separate display or physical button disposed on a side or top surface of the mobile terminal,
wherein the navigation region is further configured to enable a user to select one or more of an advertisement, a shopping item, a search engine, a specific shopping mall, a social network service, and a messenger function,
wherein the information management unit provides original content from one provider and obtains results from a different provider,
and wherein the outputting the keyword-related information is performed by the mobile advertisement providing system different from a content provider that provides the content displayed on the mobile terminal as the information display button is pressed.

* * * * *

UNITED STATES PATENT AND TRADEMARK OFFICE
CERTIFICATE OF CORRECTION

PATENT NO. : 11,055,741 B2  
APPLICATION NO. : 16/013364  
DATED : July 6, 2021  
INVENTOR(S) : Young Il Mo et al.

Page 1 of 1

It is certified that error appears in the above-identified patent and that said Letters Patent is hereby corrected as shown below:

On the Title Page

Item (73) please delete the second Assignee "CANVASEE CO.. LTD." and replace with "CANVASEE CO., LTD."

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*